Feb. 18, 1930.   J. R. WINTER   1,747,807
APPARATUS FOR CUTTING EXPANDED METAL
Filed March 15, 19..
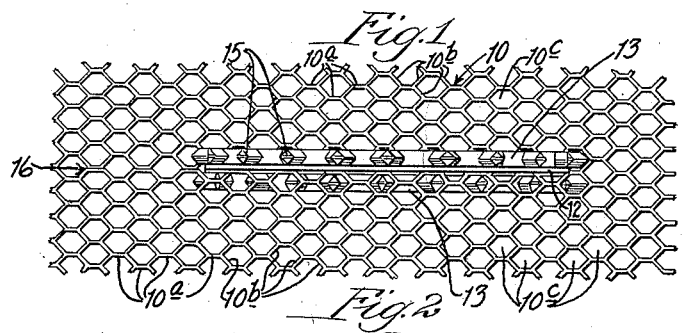
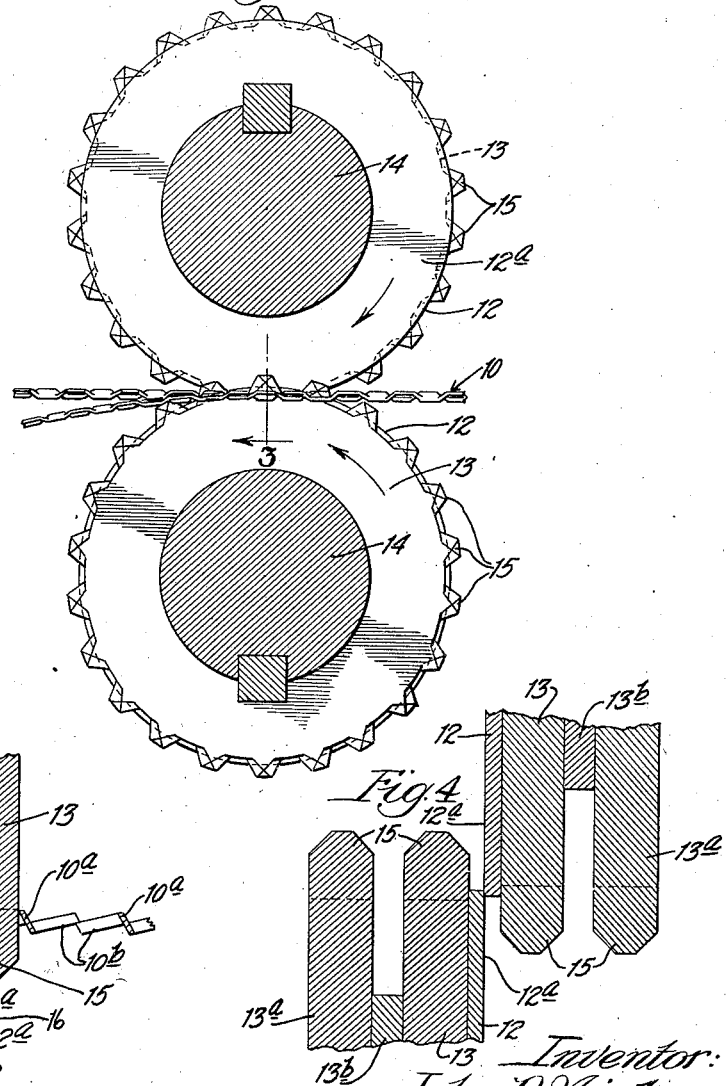

Patented Feb. 18, 1930

1,747,807

UNITED STATES PATENT OFFICE

JOHN R. WINTER, OF WARREN, OHIO, ASSIGNOR TO THE YOUNGSTOWN PRESSED STEEL COMPANY, A CORPORATION OF OHIO

APPARATUS FOR CUTTING EXPANDED METAL

Application filed March 15, 1929. Serial No. 347,361.

This invention relates to improvements in apparatus for cutting expanded metal.

One of the features of my invention is the provision of such apparatus designed to cut expanded metal and leave the cut edges relatively free from sharp edges and points. My improved apparatus is simple in design, efficient and easy to operate.

Other features and advantages of my invention will appear more fully as I proceed with my specification.

As here shown, for example, my invention is disclosed as especially designed for cutting expanded metal having longitudinal and transverse strands with openings therebetween. As here shown, the improved cutting apparatus is designed to cut along a single row of longitudinal strands, thus leaving the cut edges relatively free from projecting ends.

In that form of device embodying the features of my invention as shown in the accompanying drawings—

Figure 1 is a top plan view; Fig. 2 is a view in side elevation; Fig. 3 is a view as indicated by the line 3 of Fig. 2; and Fig. 4 is a similar view showing a modified form.

As shown in the drawings, the expanded metal is indicated in general by 10 and the same includes the longitudinal strands $10^a$ and the transverse strands $10^b$ with the hexagonal shaped openings $10^c$ therebetween. In order to leave the cut edges relatively free from projecting ends, it is desirable to cut along a single row of longitudinal strands $10^a$. In order to accomplish this, it is necessary to hold the cutting means in alinement with said row of longitudinal strands. This is accomplished as hereinafter described.

The cutting means itself preferably includes two co-operating rotary cutter disks 12, 12, one above the expanded metal and the other below, the edges of said disk, as indicated by $12^a$, $12^a$, being arranged in shearing relation to each other, as shown in Fig. 3, to cut the longitudinal strands $10^a$.

In order to hold the cutters 12, 12, in alinement with a single row of longitudinal strands $10^a$, $10^a$, I provide alining wheels 13, 13 fixedly spaced from the cutting means. I preferably attach one of these alining wheels 13 to each cutting disk 12, as shown in Fig. 3, or two of such wheels, as shown in Fig. 4, where the wheels are indicated by $13^a$ and separated by a spacer $13^b$. Each of the cutting disks 12 with its adjacent alining wheel 13 or alining wheels $13^a$ is preferably mounted on a driving shaft 14, and any suitable means (not shown) may be provided for driving the shaft 14.

Each of the alining wheels 13 or $13^a$ is provided with radial projections 15 on its periphery adapted to extend into a row of openings $10^c$ in the expanded metal parallel to and adjacent the row of longitudinal strands $10^a$ being cut. The projections 15 are preferably somewhat tapered in order to permit their easy entry into the opening $10^c$ in the expanded metal, and the bases of said projections preferably are hexagonal shaped so that they will more or less closely fit into said openings and hold the cutting means in alinement with the longitudinal strands $10^a$ being cut. It is to be understood that the thickness and size of the disk 12 and alining wheels 13, as shown in Fig. 3, or $13^a$, as shown in Fig. 4, are so that when the projections 15 are in place in the openings $10^c$ in the expanded metal, the cutting edges $12^a$ of the cutters will operate substantially on the center lines of the longitudinal row of strands $10^c$ being cut. In Fig. 1, the cut being made by the apparatus is indicated by 16.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. Apparatus for cutting expanded metal, having longitudinal and transverse strands, including: cutting means; and means for holding a row of longitudinal strands in alinement with said cutting means, said holding means including one or more alining wheels fixedly spaced from the cutting means and provided with projections extending into a row of spaces in the expanded metal parallel to said row of longitudinal strands to be cut.

2. Apparatus as claimed in claim 1, in which the cutting means include two rotary cutters, one above the expanded metal and the other below, with their cutting edges in shearing relation.

3. Apparatus as claimed in claim 1, in which the projections on the alining wheel are tapered to permit their easy entry into the spaces in the expanded metal.

4. Apparatus as claimed in claim 1, in which there is an alining wheel above and below the metal being cut.

5. Apparatus for cutting expanded metal having longitudinal and transverse strands, including; a pair of rotary cutters with cutting edges in shearing relation adapted to cut along a row of longitudinal strands; and an alining wheel carried by one of said cutters, with radial projections on its periphery adapted to extend into a row of openings in the expanded metal parallel to the row of longitudinal strands being cut.

6. Apparatus for cutting expanded metal having longitudinal and transverse strands, including; a pair of rotary cutters with cutting edges in shearing relation adapted to cut along a row of longitudinal strands; and an alining wheel carried by each of said cutters with radial projections on its periphery adapted to extend into a row of openings in the expanded metal parallel to the row of longitudinal strands being cut.

In testimony whereof I have hereunto set my hand and seal this 21st day of January, 1929.

JOHN R. WINTER.